No. 708,508. Patented Sept. 2, 1902.
D. C. WORD.
PUMP VALVE.
(Application filed May 6, 1902.)
(No Model.)

Witnesses
T. P. Britt
Harry Ellis Chandlee

Inventor
D. C. Word,
By Chandlee & Chandlee
Attorneys

UNITED STATES PATENT OFFICE.

DAVID C. WORD, OF ST. LOUIS, MISSOURI, ASSIGNOR OF ONE-FOURTH TO B. HUFFT, OF ST. LOUIS, MISSOURI.

PUMP-VALVE.

SPECIFICATION forming part of Letters Patent No. 708,508, dated September 2, 1902.

Application filed May 6, 1902. Serial No. 106,229. (No model.)

*To all whom it may concern:*

Be it known that I, DAVID C. WORD, a citizen of the United States, residing at St. Louis, State of Missouri, have invented certain new and useful Improvements in Pump-Valves; and I do hereby declare the following to be a full, clear, and exact description of the invention, such as will enable others skilled in the art to which it appertains to make and use the same.

This invention relates to pump-valves; and it has for its object to provide a construction in which the movable valve member may be reversed when it has become worn to present a new wearing-face, and thus increase the life of the valve, a further object of the invention being to provide against leakage through the valve, between the working parts thereof, and to deflect the water, so that it will not interfere with the proper working of the valve.

A further object of the invention is to provide a valve and its seat of such material as will not be affected by alkaline waters, so that the efficiency of the valve will not decrease.

Other objects and advantages of the invention will be understood from the following description.

Figure 1:
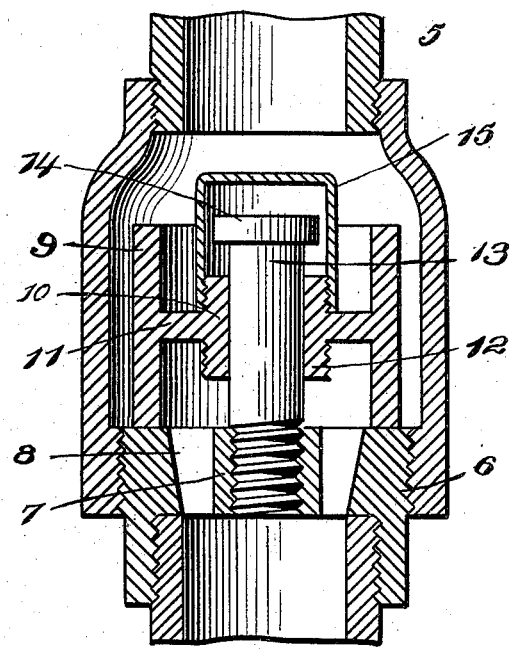
Figure 2:
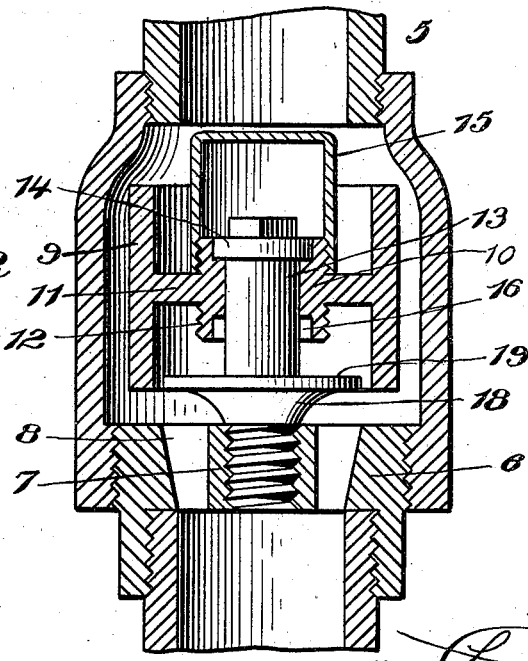

In the drawings forming a portion of the specification, and in which like numerals of reference indicate similar parts in the several views, Figure 1 is a vertical section through a portion of a pump-barrel equipped with a valve embodying the present invention. Fig. 2 is a view similar to Fig. 1 and showing a different form of valve, parts thereof being in elevation.

Referring now to the drawings and more particularly to Fig. 1, there is shown at 5 a portion of a pump-barrel in which is disposed a valve-seat, including an outer annular member 6 and an inner annular member 7, connected by means of spokes 8, the member 7 being internally threaded, as shown.

The valve proper consists of a hollow cylindrical body 9 of such diameter as to insure the end of the cylindrical body resting upon the member 6 of the valve-seat, intermediate of the inner and outer faces of the latter, the contacting faces of the valve and the member 6 being flat to insure against leakage of water between them when they are in contact.

Centrally of the member 9 is an annular hub 10, which is connected with the member 9 by a continuous web 11, the hub 10 having a central cylindrical bore 12 in axial alinement with the bore of the member 7 of the valve-seat. A spindle 13 is provided, the lower end of which is threaded and screwed into the member 7 of the valve-seat, so that said spindle forms a part of the valve-seat, and at the upper end of the spindle is an enlarged head 14. Previous to engagement of the spindle with the member 7 of the valve-seat it is passed through the hub 10 of the valve, and the head of the spindle is spaced sufficiently far from the valve-seat member 6 as to permit the cylindrical body 9 to rise to the proper height to insure sufficient operation of the pump before the upper end of the hub 10 strikes the head 14. The outer periphery of the hub 10 of the valve is threaded both above and below the web 11 to permit of engagement of an imperforate cap 15, which incloses the upper end of the spindle 13.

In Fig. 1 of the drawings the valve is shown in closed position, and it will be seen that the cap 15 prevents water in the upper part of the pump-barrel from passing downwardly or leaking between the spindle and the hub 10, it being understood that while the fit of the spindle in the hub may initially be sufficiently close to prevent this leakage to any appreciable degree it will increase as the valve becomes worn, thus necessitating priming of the pump.

In Fig. 2 of the drawings there is shown a construction which is the same as that shown in Fig. 1, with the exception that the bore of the hub 10 thereof is countersunken as shown at 16 to receive the head 14 of the spindle 13, so that a shorter spindle may be used, or the rise of the valve may be increased. Furthermore, in this form of the invention a deflector 18 is formed upon the spindle 13, said deflector terminating in an upper disk 19, which lies with its under face flush with the lower edge of the valve when the latter is raised, and thus by directing the flow of water across the lower edge of the valve prevents the lower face of the valve from moving beyond a certain distance above the valve-seat even when the valve has become shortened by wear. In this form of invention is also shown the cap for preventing leakage, although it will be understood that the cap may be omitted in both forms, if desired.

With this construction it will be noted that when one end of the cylindrical body 9 of the valve becomes worn excessively the valve may be reversed upon the spindle and the opposite end thereof may be used.

I have discovered that phosphor-bronze is unaffected with corrosion by the natural alkaline waters, and for this reason I make all parts of the valve and its seat of phosphor-bronze.

In practice other modifications of the invention may be made and any suitable proportions may be used for the various parts without departing from the spirit of the invention.

What is claimed is—

1. A valve comprising a seat having a central upwardly-directed spindle, and a movable cylindrical member having flat ends, and having a central hub and a continuous web connecting the body and the hub, said hub being slidably and removably mounted upon the spindle to permit of reversal of the body to bring its ends alternately into coöperative relation with the seat.

2. A valve comprising a seat having a central stem and openings surrounding the stem, a hollow cylindrical body mounted slidably upon the stem for movement with its end into and out of contact with the seat, and a deflecting-plate at the base of the stem, said plate extending upwardly and outwardly over the openings in the seat.

3. A valve comprising a seat having a central stem, a body having a central hub slidably mounted upon the stem and adapted for engagement with the seat, and a cap removably engaged with the hub and inclosing the upper end of the stem.

In testimony whereof I affix my signature in presence of two witnesses.

DAVID C. WORD.

Witnesses:
M. C. DURANT,
JOS. J. WOODS.